(12) United States Patent
Arndt et al.

(10) Patent No.: US 7,454,426 B2
(45) Date of Patent: Nov. 18, 2008

(54) REFERENTIAL INTEGRITY ACROSS A DISTRIBUTED DIRECTORY

(75) Inventors: Karla Kay Arndt, Rochester, MN (US); Mark Joseph Cavage, Cedar Park, TX (US); John Ryan McGarvey, Apex, NC (US); John D. Sullivan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 11/104,319

(22) Filed: Apr. 12, 2005

(65) Prior Publication Data

US 2006/0230121 A1    Oct. 12, 2006

(51) Int. Cl.
*G06F 17/30* (2006.01)

(52) U.S. Cl. .............................. 707/10; 707/3; 707/202; 709/203

(58) Field of Classification Search .................... 707/10, 707/100, 2–5, 200–202; 709/203
See application file for complete search history.

(56) References Cited

U.S. PATENT DOCUMENTS

| | | | |
|---|---|---|---|
| 5,787,442 A | 7/1998 | Hacherl et al. .............. | 707/201 |
| 6,286,010 B1 * | 9/2001 | Ramachandran et al. | 707/103 R |
| 6,424,976 B1 | 7/2002 | Jarvis et al. ................. | 707/201 |
| 6,519,610 B1 | 2/2003 | Ireland et al. ............ | 707/104.1 |
| 6,539,379 B1 * | 3/2003 | Vora et al. ..................... | 707/6 |
| 6,651,047 B1 | 11/2003 | Weschler, Jr. .................. | 707/1 |
| 7,340,453 B2 * | 3/2008 | Raman et al. .................. | 707/3 |

* cited by examiner

*Primary Examiner*—Cheryl Lewis
(74) *Attorney, Agent, or Firm*—Duke W. Yee; Jeffrey S. LaBaw; Cathrine K. Kinslow

(57) ABSTRACT

A system and method for autonomically maintaining group referential integrity across a distributed directory. When a server receives an operation request from a client regarding an entry in the distributed directory, the server sends a request to the particular server containing the entry to be modified that instructs the server to modify the entry, but without performing a referential integrity check. The server then determines whether the request returned successfully. If so, the server sends a request to each server in the network to perform the requested operation on all group references for the entry, but without actually performing the requested operation on the entry itself. If all of these requests return successfully, the server notifies the requesting client that the requested operation has been performed.

17 Claims, 4 Drawing Sheets

REFERENTIAL INTEGRITY ACROSS A DISTRIBUTED DIRECTORY

BACKGROUND OF THE INVENTION

1. Technical Field

The present invention relates generally to an improved data processing system, and in particular, to a mechanism for maintaining group referential integrity across a distributed directory.

2. Description of Related Art

In today's computing environment, complex network data processing systems often are needed to facilitate work in large corporations. These complex networks may even span across regions in various worldwide locations, as well as use the Internet as part of a virtual private network for conducting business. In many instances, a federated data model is employed to allow enterprise components to share and access information and resources throughout the network. With the federated data model, wherein multiple data sources appear as one to users, data resides and is controlled locally, and client users in the system, regardless of location, needing the information may access the data using a directory service.

Directory services serve as central repository for searching, adding, deleting and modifying data. Example methods of accessing directory services in a computer network include X.500 and Lightweight Directory Access Protocol (LDAP). Lightweight Directory Access Protocol (LDAP) is a software protocol for enabling a user to locate organizations, individuals, and other resources such as files and devices in a network, whether on the Internet or on a corporate Intranet. LDAP is a "lightweight" version of Directory Access Protocol (DAP), which is part of X.500, a standard for directory services in a network.

A directory may be distributed among many servers. In such a situation, each server may have a replicated version of the total directory that is synchronized periodically. Upon receiving a request from a client user, the LDAP server takes responsibility for the request. This responsibility includes passing the request on to other servers as necessary, but ensuring a single coordinated response for the client user.

Referential integrity rules may be used to maintain the consistency of the information residing in a distributed directory. Referential integrity rules are applicable to both the entries residing in a component of the network and the groups to which the entries belong, regardless of location. Entries in which referential integrity needs to be performed may exist anywhere in the network. For example, an entry is deleted on one computer system and the entry is also a member of several groups. As those groups may exist anywhere in the network, the entry should be deleted from all group entries in the network. Likewise, an entry may be renamed on one computer system and the entry is a member of several groups. As those groups may exist anywhere in the network, the entry needs to be renamed in all those groups.

Although referential integrity is not a new concept, problems exist when maintaining referential integrity across a distributed directory. Steps an administrator or application writer may currently take to maintain referential integrity across a distributed directory would be to first search each directory in the network to find the entries that need updating, and then perform update operations on each of those entries. For example, if the server performed referential integrity on group membership and an entry was deleted, an application would need to be written to search every server in the network for groups in which the deleted entry was a member. These groups could be of many different types and the application writer would need to know all the types of groups for which to search. Then, once the groups were found, separate modify operations would need to be performed for each group to delete the member from the group. These steps are both cumbersome and slow performing. In addition, the administrator or application writer would need to know whenever the referential integrity was enhanced on the servers in order to change their methodology and enhance their applications to be compatible with the directory servers. In the previous example, the application writer would need to update the application every time a new type of group was implemented or used in the network.

In another example, if an entry was renamed rather than deleted, the application writer must delete the old name and replace it with a new name. If the rename was a two-step process (i.e., delete the entry from one server in the network and add the entry to another server in the network), the application writer would have to find a way to notify the server that the server should not delete the entry from the groups, but rather rename the entry. This type of request does not currently exist. If the application writer first searched the directory for all groups prior to performing the delete operation, the same problems previously identified with above would occur.

Therefore, it would be advantageous to have an improved system and method for maintaining referential integrity, wherein the referential integrity is performed in a distributed network.

SUMMARY OF THE INVENTION

The present invention provides a system and method for autonomically maintaining group referential integrity across a distributed directory. When a server receives an operation request from a client regarding an entry in the distributed directory, the server sends a request to the particular server containing the entry to be modified that instructs the server to modify the entry, but without performing a referential integrity check.

If the request returns successfully to the server, the server then sends a request to each server in the network to perform the requested operation on all group references for the entry, but without actually performing the requested operation on the entry itself. The server then determines whether the requests sent to the servers all returned successfully.

If all of the requests return successfully, the server notifies the requesting client that the requested operation has been performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
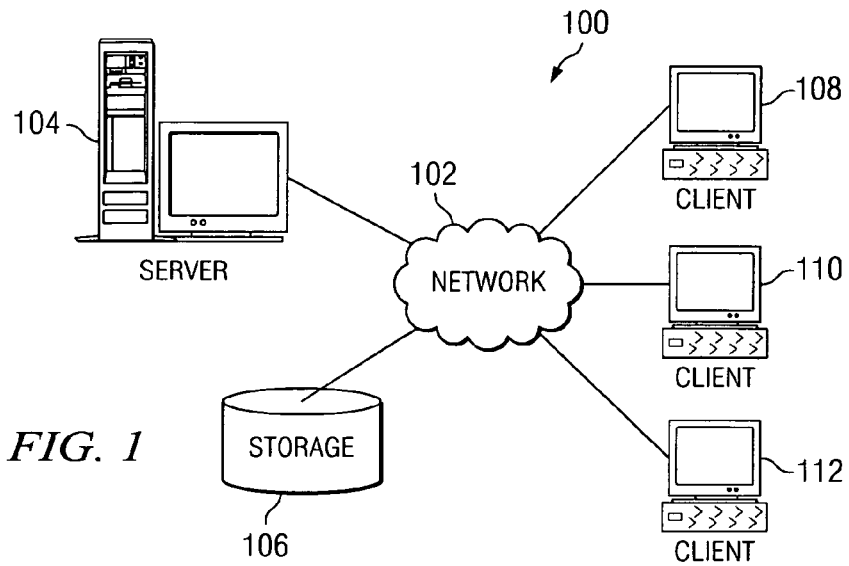
FIG. 1 depicts a pictorial representation of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
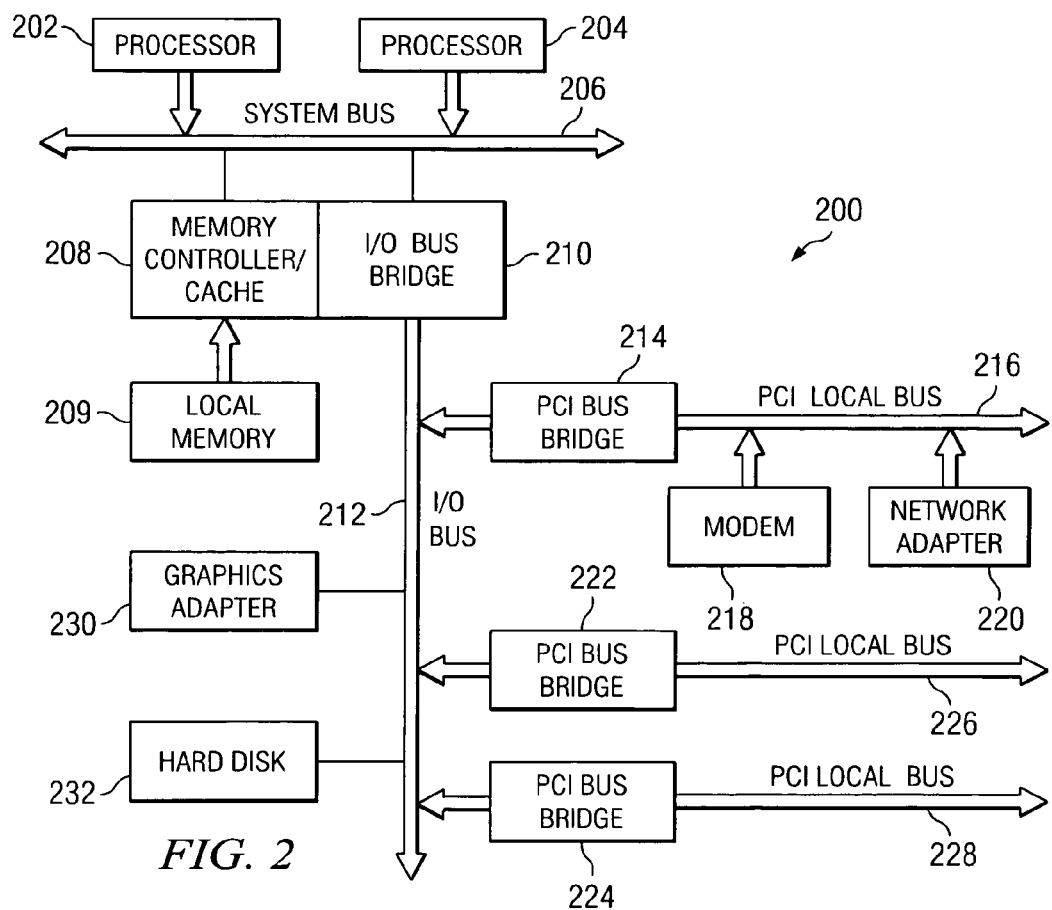
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
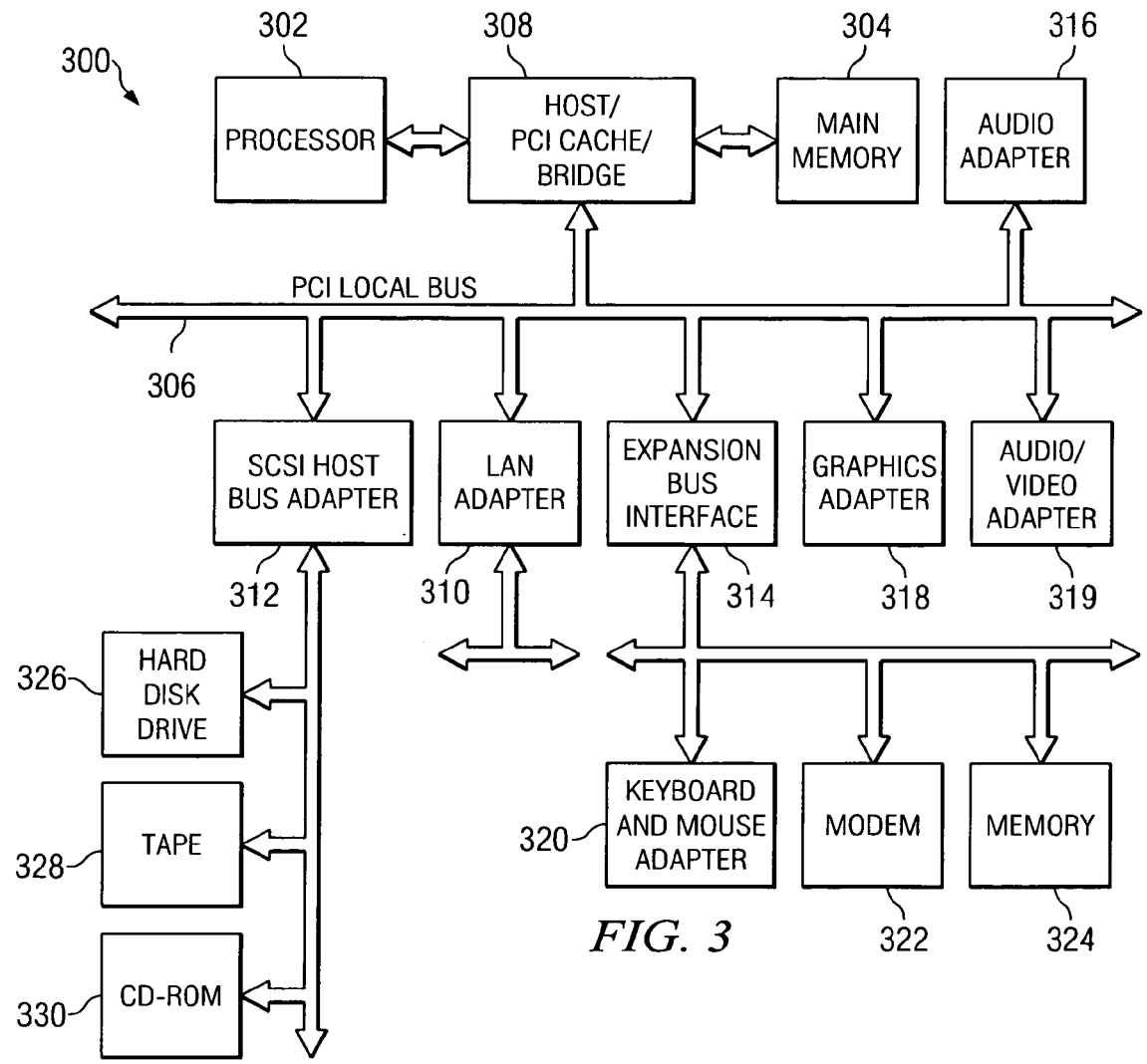
FIG. 3 is a block diagram of a data processing system that may be implemented as a client in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java™ may run in conjunction with the operating system and provide calls to the operating system from Java™ programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3.

Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, existing referential integrity methods, when an entry in a distributed directory is updated, require a search to be performed to locate all groups in which the entry was a member. Once the groups are identified, separate modify operations must then be performed to update each group. Existing referential integrity systems that perform group referential integrity do so only on individual machines in the network, rather than across a distributed directory.

The present invention provides an advantage over existing methods by providing a mechanism for autonomically maintaining group referential integrity across a distributed directory. With the mechanism of the present invention, the integrity of data in the directory service may be maintained for each entry and for each group in which the entry is a member. In addition, the present invention proffers a solution to the current limitations of group referential integrity by providing a mechanism that is automatically upwardly compatible with new releases of a server. For example, as new types of groups are added to the system, existing methods of referential integrity require that these additions be reflected in the referential integrity application. It is not necessary for the system administrator or application writer to make enhancements to the group referential integrity application for new types of groups, since the group referential integrity check of the present invention may be performed on all types of groups supported by each server in the network. In addition, the solution provided by the present invention lessens the time needed to perform a group referential integrity check. The referential integrity check in the present invention performs much faster than the existing methods of sending search requests to every server followed by modify requests on every group in which the entry was a member.

The mechanism of the present invention may be used to update entries in the directory service and the groups in which the entries are members. In particular, a delete or rename operation may be performed on an entry residing in a data store in a particular server in the network. For instance, when a client requests that a delete or rename operation be performed on an entry, the remote server containing the entry in the network is instructed to modify the actual entry. However, the remote server containing the entry is instructed not to perform a referential integrity check on the group references specified in the entry, or else the group membership for the entry would be lost (i.e., the entry would be deleted as a member from all groups in which the entry was a member, even through these group references may still be needed in a rename operation).

Once the entry has been modified, each remote server in the network is instructed to also perform the requested operation, but on the group references for the entry. For instance, when a client requests that a delete operation be performed on an entry, the servers in the network are contacted and instructed to delete all references to the entry from each group in which the entry is a member. When a client requests that a rename operation be performed on an entry, the servers are instructed to rename all references to the entry in each group in which the entry is a member.

Figure 4:
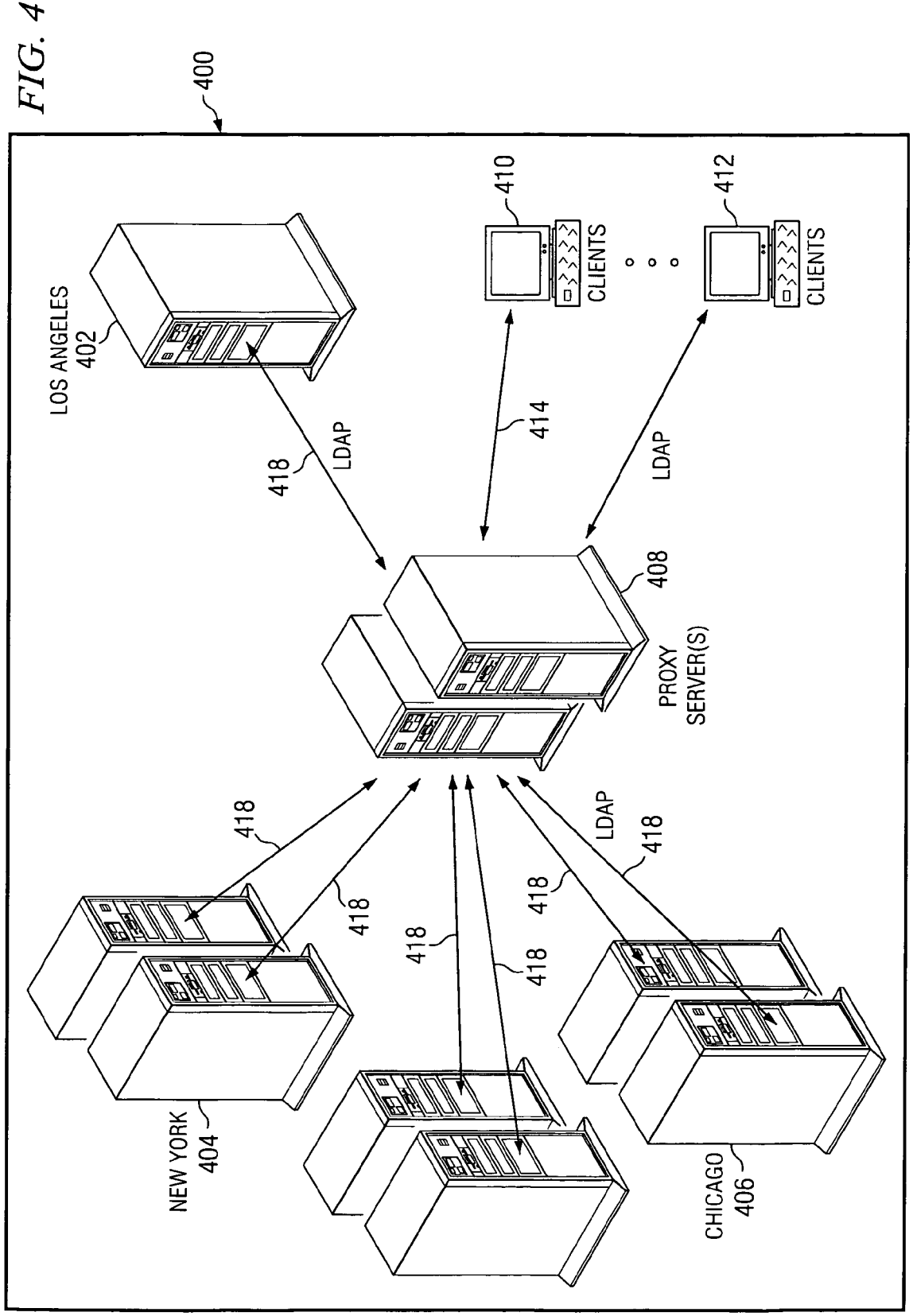
FIG. 4 is a block diagram illustrating exemplary components used for maintaining referential integrity across a distributed directory in accordance with a preferred embodiment of the present invention.

Turning now to FIG. 4, a block diagram illustrating exemplary components for maintaining referential integrity across a distributed directory in accordance with a preferred embodiment of the present invention is shown. The process illustrated in FIG. 4 may be implemented in a distributed computer network, such as network data processing system 100 shown in FIG. 1.

Distributed computer network 400 comprises various components within a company, including Los Angeles server 402, New York server 404, and Chicago server 406, proxy server 408, and client computers 410 and 412. Remote servers 402-406 are examples of a server, such as server 200 in FIG. 2. Clients 410 and 412 are examples of a client, such as client 300 in FIG. 3.

In this illustrative example, payroll operations, employee benefit operations, and a branch office of the company each reside in different locations. The New York location contains New York server 404, which contains payroll operations for the company. The Chicago location contains Chicago server 406, which contains the benefits operations for the company. The Los Angeles location contains Los Angeles server 402, which contains entries for the salespeople in the Los Angeles office.

In this example, Los Angeles server 402, New York server 404, and Chicago server 406 comprise federated data. As mentioned above, Los Angeles server 402 contains the salespeople for the company, including an entry for a particular salesperson named "Joe". As Joe is located in Los Angeles, the information technology department in Los Angeles manages Joe's login and account information for the corporation network.

As New York server 404 contains the payroll operations, and Chicago server 406 contains the benefits operations for the company, payroll and benefits do not reside in the same location as the entry for Joe. Instead, New York server 404 and Chicago server 406 contain only references to each salesperson entry in Los Angeles. In order to be paid and receive benefits, Joe would need to be referenced within a payroll group and a benefits group in the New York and Chicago servers. Thus, the payroll and benefits locations contain defined groups in a directory service, wherein each group contains references to entries residing in other server locations within the company.

Clients 410 and 412 are client machines within the distributed network and may be used to access data residing in servers 402-406. Clients 410 and 412 may reside in the same location as servers 402-406, or in another location in the network. In a preferred embodiment, clients 410 and 412 access the directory service using Lightweight Directory Access Protocol (LDAP).

Also in this illustrative example, proxy server 408 is used to enforce referential integrity across the distributed network. It should be noted that although only one proxy server is shown in this example, with the present invention, any number of proxy servers may be used within the distributed network shown. Proxy server 408 may be, for example, a server such as server 200 in FIG. 2. However, other types of servers, such as a "smart client", may be used as proxy server 408, as will be obvious to those skilled in the art.

Proxy servers are generally known in the art. Clients 402-406 may send requests to proxy server 408 to obtain data in the directory service. From the client's perspective, proxy server 408 is dedicated to servicing that client's needs, and all requests may be forwarded to the proxy server. The proxy server may funnel all user requests to the directory service and fan responses back out to the appropriate users.

Within distributed computer network 400, when a user, such as an accountant, on client 402 located in New York initiates the payroll operations for the company, the payroll operations use the groups defined in New York server 404 to determine who should be paid. Based on the references specified in the groups, the payroll operation accesses entries in the applicable servers in the network. As each entry in LDAP has a unique name (i.e., distinguished name), if the entry for Joe is referenced in the payroll group, the payroll operation will use the unique name for the entry to obtain Joe's information within Los Angeles server 402 so that Joe may be paid. The payroll operation will access information on Los Angeles server 402 via proxy server 408.

When an entry in a remote server is modified (e.g., removed or renamed), references to the entry contained within other remote servers in the network should also be updated to reflect the modification. For example, Joe finds another job and is no longer employed by the company. In this scenario, the company no longer wants to allow Joe access the network, and the company also no longer wants to pay him. While existing systems would typically require that all references to Joe in the distributed directory be located and then removed (e.g., Joe's manager may submit a request to the system administrator to find all references to Joe in the directory and remove him), the present invention allows a client user, with the appropriate authority, to simply issue a delete request to one of the proxy servers.

When a request to modify an entry, such as delete or rename request 414, is received from a user or manager at a client, proxy server 408 then instructs the remote server containing the entry via a request through connection 418 to modify the entry. However, the server containing the entry is instructed not to perform a referential integrity check on the group references specified in the entry, since any group memberships for the entry would be lost if the check was performed. Proxy server 408 then instructs each server in the network via requests through connections 418 to perform the requested operation on all references to Joe. In this manner, data consistency may be maintained when a modification request is performed.

Figure 5:
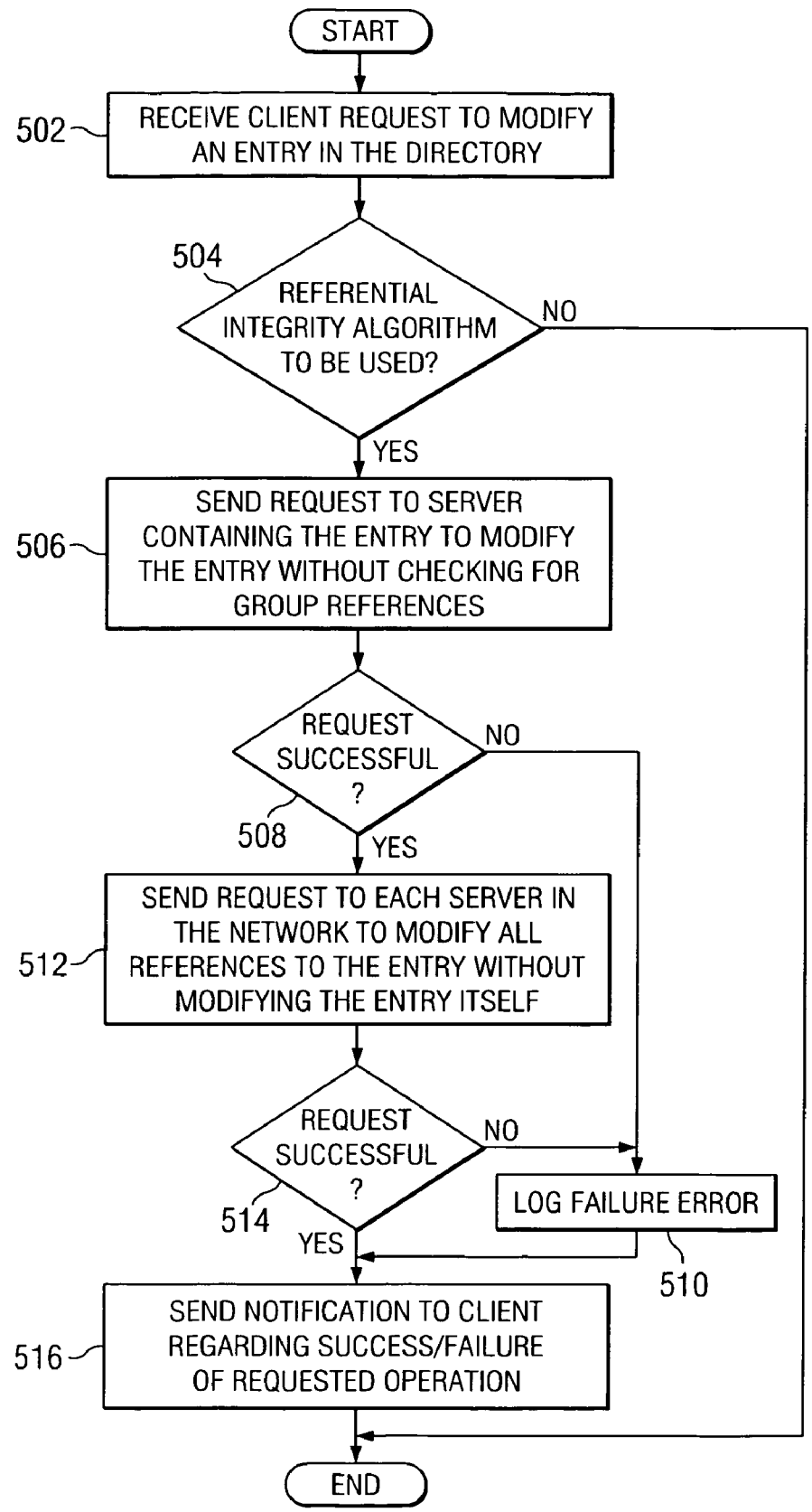
FIG. 5 is a flowchart of a process for processing a client request for an entry and maintaining referential integrity in a distributed directory in accordance with a preferred embodiment of the present invention.

FIG. 5 is a flowchart of a process for processing a client request for an entry and maintaining referential integrity in a distributed directory in accordance with a preferred embodiment of the present invention. The client request may be one of a delete or rename operation, or any operation that affect groups in the directory. The process described in FIG. 5 may be implemented in a server, such as proxy server 408 in FIG. 4.

The process begins with the proxy server receiving an operation request regarding an entry in the distributed directory (step 502). This request may be initiated by a client, such as client 402 in FIG. 4. The request may include an update request, such as delete or a rename request. When the request is received, the proxy server inspects the request and determines if the referential integrity process of the present invention should be used (step 504). This determination may be based on whether a rename or delete operation is requested, as these operations affect groups in the directory. If the referential integrity process should not be used, the process terminates thereafter.

If the proxy server determines that the referential integrity process should be used, the proxy server sends a request to the remote server containing the entry to be modified, instructing the server to modify the entry, but without performing a check for group references (step 506). A determination is then made as to whether the modification request returned successfully the proxy server (step 508). If the request was not successful, an error is logged to the system (step 510) and a notification is sent to the client that the requested operation was attempted, but failed (step 516). Consequently, the entry remains in the remote server. A system administrator may then review the log file and identify the cause of the error (e.g., the server was down, etc.).

Turning back to step 508, if the request comes back successfully, the proxy server sends a request to every remote server in the network, asking each server to perform the requested operation on all group references for the entry, but without actually performing the operation on the entry itself (step 512). For example, if the proxy server receives a request to rename the Joe entry, the proxy server then requests that the other servers in the network rename only the references to Joe, and not to rename the Joe entry.

A determination is then made as to whether the modification requests all returned to the proxy server successfully (step 514). If any request was not successful, an error is logged to the system (step 510) and a notification is sent to the client that the requested operation was attempted, but failed (step 516). Any unsuccessful group reference modifications remain in their respective servers, and the system administrator may then review the log file and identify the cause of the error.

Turning back to step 514, if the modification request returns successfully to the proxy server, the proxy notifies the requesting client (e.g., manager) that the requested operation has been successfully performed in the distributed directory (step 516).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a server for maintaining referential integrity across a distributed directory in a network data processing system, the method comprising:

receiving a first request for an operation from a client regarding an entry in the distributed directory;

sending a second request to a remote server containing the entry, wherein the second request instructs the remote server to perform the operation on the entry and to omit referential integrity processing;

responsive to a determination that the second request has returned successfully, sending a third request to each remote server in the network data processing system, wherein the third request instructs each remote server to perform the operation on its own group references for the entry and to omit the operation on the entry itself; and responsive to a determination that the second or third requests have not returned successfully, logging an error in a log file, wherein information in the log file is used to identify a cause of the error.

2. The method of claim 1, further comprising:

responsive to a determination that the third request has returned successfully, notifying the client that requested operation has been performed.

3. The method of claim 2, wherein the receiving, sending, and notifying steps are performed by a proxy server.

4. The method of claim 1, wherein the first request is one of a delete and rename operation.

5. The method of claim 1, wherein third request instructs each remote server to perform the operation on its own group reference for the entry regardless of whether or not the entry is present.

6. The method of claim 1, wherein the client sends the first request using Lightweight Directory Access Protocol.

7. The method of claim 1, wherein the second request is sent to the remote server if the client has appropriate authority to issue the first request.

8. A data processing system for maintaining referential integrity across a distributed directory, comprising:

a plurality of servers, wherein a first server in the plurality of servers receives a first request for an operation regarding an entry in a distributed directory from a client computer, sends a second request to a second server containing the entry, wherein the second request instructs the second server to perform the operation on the entry and to omit referential integrity processing, and sends a third request to each server in the plurality of servers in response determining that the second request has returned successfully, wherein the third request instructs each server to perform the operation on its own group references for the entry and to omit the operation on the entry itself; and wherein the first server further logs an error in a log file in response to determining that the second or third requests have not returned successfully, wherein information in the log file is used to identify a cause of the error.

9. The data processing system of claim 8, wherein the first server further notifies the client that the requested operation has been performed in response to determining that the third request has returned successfully.

10. The data processing system of claim 9, wherein the first server is a proxy server.

11. The data processing system of claim 8, wherein the first request is one of a delete and rename operation.

12. The data processing system of claim 8, wherein the third request instructs each server in the plurality to perform the operation on its own group references for the entry regardless of whether or not the entry is present.

13. The data processing system of claim 8, wherein the client sends the first request using Lightweight Directory Access Protocol.

14. The data processing system of claim 8, wherein the second request is sent to each server if the client has appropriate authority to issue the first request.

15. A computer program product in a computer readable storage medium for maintaining referential integrity across a distributed directory in a network data processing system, comprising:

first instructions for receiving a first request for an operation from a client regarding an entry in the distributed directory;

second instructions for sending a second request to a remote server containing the entry, wherein the second request instructs the remote server to perform the operation on the entry and to omit referential integrity processing;

third instructions for sending a third request to each remote server in the network data processing system in response to determining that the second request has returned successfully, wherein the third request instructs each remote server to perform the operation on its own group references for the entry and to omit the operation on the entry itself; and fourth instructions for logging an error in a log file in response to determining that the second or third requests have not returned successfully, wherein information in the log file is used to identify a cause of the error.

16. The computer program product of claim 15, further comprising:

fourth instructions for notifying the client that requested operation has been performed in response to determining that the third request has returned successfully.

17. The computer program product of claim 15, wherein the first request is one of a delete and rename operation.

\* \* \* \* \*